United States Patent [19]
Corbin

[11] Patent Number: 5,138,712
[45] Date of Patent: Aug. 11, 1992

[54] APPARATUS AND METHOD FOR LICENSING SOFTWARE ON A NETWORK OF COMPUTERS

[75] Inventor: John R. Corbin, Sunnyvale, Calif.

[73] Assignee: Sun Microsystems, Inc., Mountain View, Calif.

[21] Appl. No.: 415,984

[22] Filed: Oct. 2, 1989

[51] Int. Cl.$^5$ ............................................. G06F 12/14
[52] U.S. Cl. ............................. 395/700; 364/260.81; 364/280.2; 364/280.6; 364/286; 364/DIG. 1
[58] Field of Search ... 364/200 MS File, 900 MS File; 235/380, 382, 375; 380/4

[56] References Cited

U.S. PATENT DOCUMENTS

| | | | |
|---|---|---|---|
| 4,238,853 | 12/1980 | Ehrsam et al. | 375/2 |
| 4,259,720 | 3/1981 | Campbell | 364/200 |
| 4,458,315 | 7/1984 | Uchenick | 364/200 |
| 4,584,639 | 4/1986 | Hardy | 364/200 |
| 4,652,990 | 3/1987 | Pailen et al. | 364/200 |
| 4,780,821 | 10/1988 | Crossley | 364/200 |
| 4,891,503 | 1/1990 | Jewell | 235/380 |
| 4,919,545 | 4/1990 | Yu | 380/25 |
| 4,924,378 | 5/1990 | Hershey et al. | 364/200 |
| 4,937,863 | 6/1990 | Robert et al. | 380/4 |
| 5,023,907 | 6/1991 | Johnson et al. | 380/4 |

FOREIGN PATENT DOCUMENTS

| | | |
|---|---|---|
| 78300747.9 | 12/1978 | European Pat. Off. |
| PCT/US87/02301 | 3/1988 | PCT Int'l Appl. |

*Primary Examiner*—Gareth D. Shaw
*Assistant Examiner*—John C. Loomis
*Attorney, Agent, or Firm*—Blakely Sokoloff Taylor & Zafman

[57] ABSTRACT

The present invention provides to the software application the verification and license check out functions which are normally performed by a license server of a network software license system. The encrypted license information is contained in a license token, and is sorted in the database controlled by the license server. In contrast to the prior art where the license server either grants or denies the request after verifying the user's credentials, the license server in the preferred embodiment of the present invention finds the correct license token for the software application and transmits the license token to the licensing library. In application specific license access module attached to the application decodes the licensing token. Routines in the licensing library coupled to the software application verify the license information before checking out the license and updating the license token. The application specific license access module then encodes the updated license token before returning it to the license server. Thus, the impact of breaching the encryption/decryption of an application is limited to only one application. As a result, the present invention provides improved network-wide protection against unauthorized use of software applications in a network of computers.

28 Claims, 6 Drawing Sheets

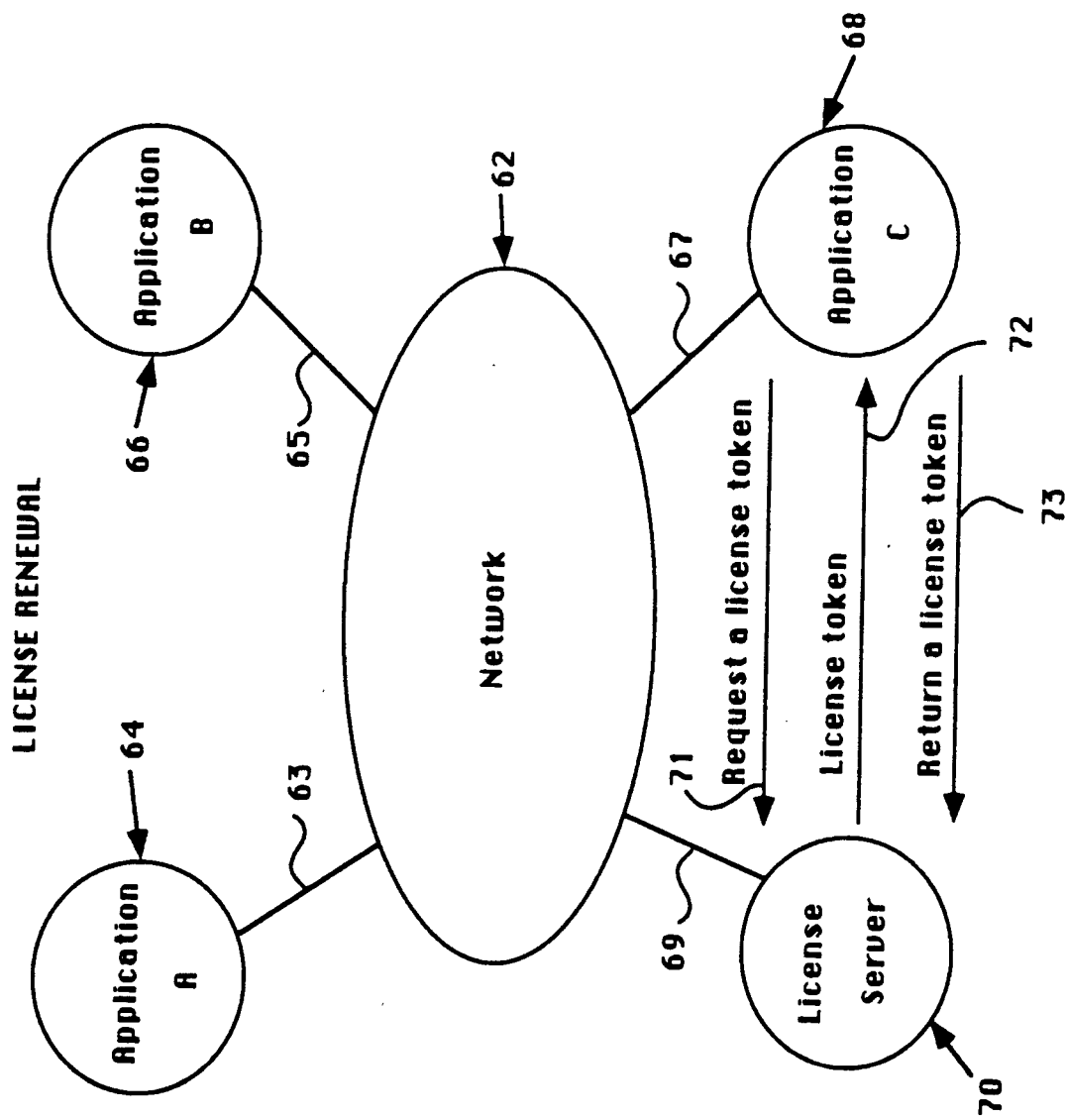

APPARATUS AND METHOD FOR LICENSING SOFTWARE ON A NETWORK OF COMPUTERS

BACKGROUND OF THE INVENTION

1. Field of the Invention

The present invention relates to licensing software in a network of computers. More particularly, the present invention relates to an apparatus and method for licensing software applications in a network of computer that further increases network-wide protection against their unauthorized use.

2. Art Background

A computer network is typically an interconnection of machines or agents over links or cables. The open access characteristics of a computer network presents opportunities for the unauthorized copying of software, thus eroding the licensing revenue potential of software developers. Traditionally, either the entire network must be licensed (commonly referred to as a site license), or each node where the software is run must be licensed (commonly referred to as a node license). A node refers to a single machine, agent or system in a computer network. A license is an authorization given by a software developer to a customer to use a softward application in a specific manner.

A site license lets all users at a designated location or network use the software application, regardless of their position on the network. This flat-fee approach is an overkill for a low usage software application. A node license not only ties a software application to a particular machine in a network, but also is not cost effective for the infrequent use of a software application. See, for example, U.S. Pat. No. 4,688,169. Futhermore, if new users of licensed nodes wish to use the software application, they are often required to purchase additional licenses.

An alternative to a site license or a node license is the concept of a concurrent usage license. A concurrent usage license restricts the number of users allowed to use a softward application at any given time, regardless of their location on the network. Just as renters check out available copies of a movie video from a video rental store, users on a network check out a software application from an agent on a first-come-first serve basis. Thus, a concurrent usage license charges a fee for the use of a software application proportional to its actual use.

Methods of license a software application for concurrent use in a network environment are currently offered by a number of manufacturers including Highland Software, Inc. and Apollo Computer, Inc. See, M. Olson adn P. Levine, "Concurrent Access Licensing", *Unix Review*, September 1988, Vol., 6, No.9. A concurrent use license system for a network of computers typically comprises a number of license databases, a number of license servers, a number of application libraries and a set of administration tools. Each license database comprises a set of license information and a set or corresponding current usage information. The set of license information comprises information about a set of vendors, the vendor's products and the number of licenses purchased for each product. The corresponding current usage information comprises the products in use, the number of license in use for each product, and the users/processes currently licensed to use the product. Each license server manages a license database. It services requests for assignment and release or licenses stored in its license database. It also services requests for addition/deletion of vendors, products, and/or licenses into/from its license database. Each application library manages acquisition of licenses for the applications installed on the application library's node. The administration tools manages installation of the licenses.

To protect against the authorized use, these methods of license concurrent usage rely on secured communications such as public/private key encryption. Under public/private key encryption, each user of the system has two keys, one of which is generally known to the public, and the other which is private. The private transformation using the private key is related to the public one using the public key but the private key cannot be computationally determined from the public key. See Denning D., *Cryptography and Data Security*, Addison-Wesley, 1982. The private key is hidden in the license server to encrypt the database of licenses. Well designed public/private key encryption schemes are difficult to crack, especially if the license server is located in a trusted environment. A trusted environment is one whose access is limited to users having the proper credentials. However, a license server is more likely to be located at a customer's site and hence in an hostile environment. It follows that the license server is vulnerable to sophisticated intruders. Once the private key is decrypted, all sensitive information on the license server such as licenses are compromised.

It is therefore an object of the present invention to provide a more secure method to protect against the unauthorized use of software in a concurrent use licensing environment.

SUMMARY OF THE INVENTION

The present invention provides to the software application the verification and license check out functions which are normally performed by a license server. The preferred embodiment of the present invention comprises a computer network including a plurality of agents running at least one license server and at least one software application. The license server controls a database of an agent containing the license information for the software application. The license information is contained in a license token, and is stored in the database controlled by the license server. The license token is a special bit pattern or packet which is encrypted by the software vendor of the application software. The software application communicates with the license server through a licensing library. The licensing library is a collection of library routines that the software application invokes to request or renew a license from the licenser server. Before a software application obtains a license, the license token must be decoded by an application specific license access module. The application specific license access module, which is linked with the software application and the licensing library is a program that decodes the license token from a vendor specific format to a licensing library format.

When a user wishes to run a software application, the licensing library invokes a call to request a license token from the license server. In contrast to the prior art which the license server either grants or denies the request after verifying the user's credentials, the license server in the preferred embodiment of the present invention finds the correct license token for the software application and transmits the license token to the licensing library. The application specific license access module attached to the licensing library decodes the licensing token. Routines in the licensing library coupled to the software application verify the license information before checking out the license and updating the license token. The application specific license access module encodes the updated license token before returning it to the license server.

Because the verification and check out function of a license token are performed by a software application, the software application rather than the license server becomes the point of attack by unauthorized users. Reverse engineering the application specific license access module is less rewarding than attacking the license server because the application specific license access module reveals the contents of a database of licenses. By the time most attackers crack the application specific license access module, the software vendors would most likely introduce newer versions of the software application and new application specific license access modules for them. Thus the present invention provides a more secure method for protecting against the unauthorized sue of a software application in a computer network environment without modifying the underlying computer network.

BRIEF DESCRIPTION OF THE DRAWINGS

FIG. 4b illustrates the use of a license token to renew a license from a license server in the preferred embodiment of the present invention.

NOTATION AND NOMENCLATURE

Figure 1:
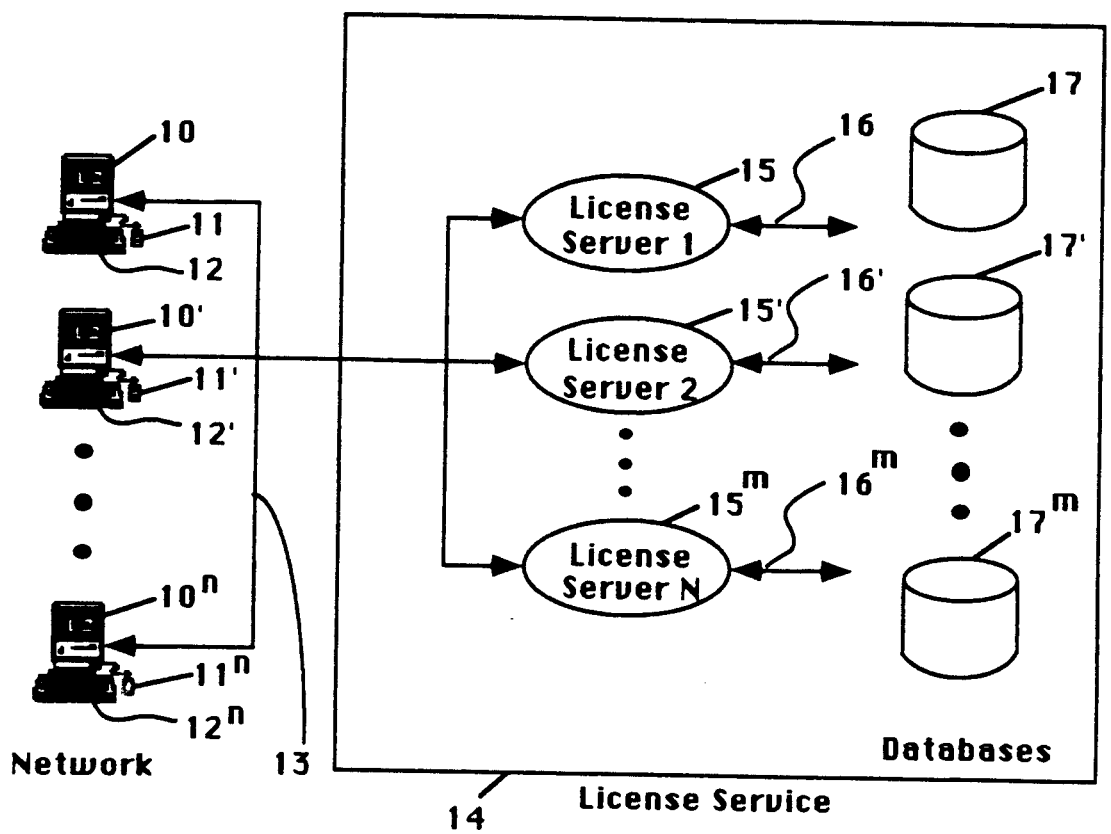
FIG. 1 illustrates a network environment employing the present invention.

The detailed description that follows is presented largely in terms of algorithms and symbolic representations of operations on data bits and data structures within a computer memory. These algorithmic descriptions and representatons are the means used by those skilled in the data processing arts to most effectively convey the substance of their work to others skilled in the art.

An algorithm is here, and generally, conceived to be a self-consistent sequence of steps leading to a desired result. These steps are those requiring physical manipulation of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bit patterns, values, elements, symbols, characters, data packages, or the like. It should be borne in mind, however, that all of these and similar terms are to be associated with the appropriate physical quantities and are merely convenient labels applied to these quantities.

Further, the manipulations performed are often referred to in terms, such as adding or comparing, that are commonly associated with mental operations performed by a human operator. No such capability of a human operator is necessary, or desirable in most cases, in any of the operations described herein that form part of the present invention; the operations are machine operations. Useful machines for performing the operations of the present invention include general purpose digital computers or other similar devices. In all cases there should be borne in mind the distinction between the method of operations in operating a computer and the method of computation itself. The present invention relates to method steps for operating a computer in processing electrical or other (e.g. mechanical, chemical) physical signals to generate other desired physical signals.

The present invention also relates to an apparatus for performing these operations. This apparatus may be specially constructed for the required purposes, or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct a more specialized apparatus to perform the required method steps. The required structure for a variety of these machines will appear from the description given below.

DETAILED DESCRIPTION OF THE INVENTION

An apparatus and method for licensing an application executing in a computer of a network of computers that further increases network-wide protection against unauthorized use of applications is disclosed, which has particular application to concurrent use licensing or software in a network of computers. In the following description for purposes of explanation, specific applications, numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Referring to FIG. 1, computer network environment comprises a plurality of data processing devices identified generally by numerals 10 through $10^n$ (illustrated as 10, 10' and $10^n$). These data processing devices may include terminals, personal computers, workstations, minicomputer, mainframes and even supercomputers. For the purposes of this Specification, all data processing devices which are coupled to the present invention's network are collectively referred to as "agents". It should be understood that the agents may be manufactured by different vendors and may also use different operating systems such as MS-DOS, UNIX, OS/2, MAC OS and others. Particular examples of suitable agents include machines manufactured by Sun Microsystems, Inc., Mountain View, Calif. Each of the agents has an input device such as a keyboard 11, 11' and $11^n$ or a mouse 12, 12' and $12^n$. As shown, agents 10 through $10^n$ (illustrated as 10, 10' and $10^n$) are interconnected for data transfer to one another by a common cable 13. It will be appreciated by one skilled in the art that the common cable 13 may comprise any shared media, such as coaxial cable, fiber optics, radio channel and the like. Furthermore, the network resulting from the interconnection of the cable 13 and agents 10 through $10^n$ (illustrated as 10, 10' and $10^n$) may asume a variety of topologies, such as ring, star, bus, and may also include a collection of smaller networks linked by gateways or bridges.

Referring again to FIG. 1 is a license service 14. The license service 14 is a resource shared by every agent connected to the network. In the preferred embodiment of the present invention, the license service 14 comprises license servers 15 through $15^m$ (illustrated as 15, 15' and $15^m$) and databases 17 through $17^m$ (illustrated as 17, 17' and $17^m$), where m is less than or equal to n. A license server is a program that runs on an agent with a memory storage capability. Each license server 15 (illustrated as 15, 15' and $15^m$) communicates with a database 17 stored in memory on the agent over an interface 16 (illustrated as 16, 16' and $16^m$). As will be described in detail below, the database 17 stores licensing information for various software applications which are purchased and authorized to run in the computer network environment. Each license server 15 mangages storage and retrieval, including installation and deletion, of license information in its corresponding database 17. The license server is not limited to run on a specific agent, but can operate on any agent including the agent on which the user is to operate the application. Thus, any agent connected to the network may function as a license server as well as a device on which a user may operate application software.

Figure 2:
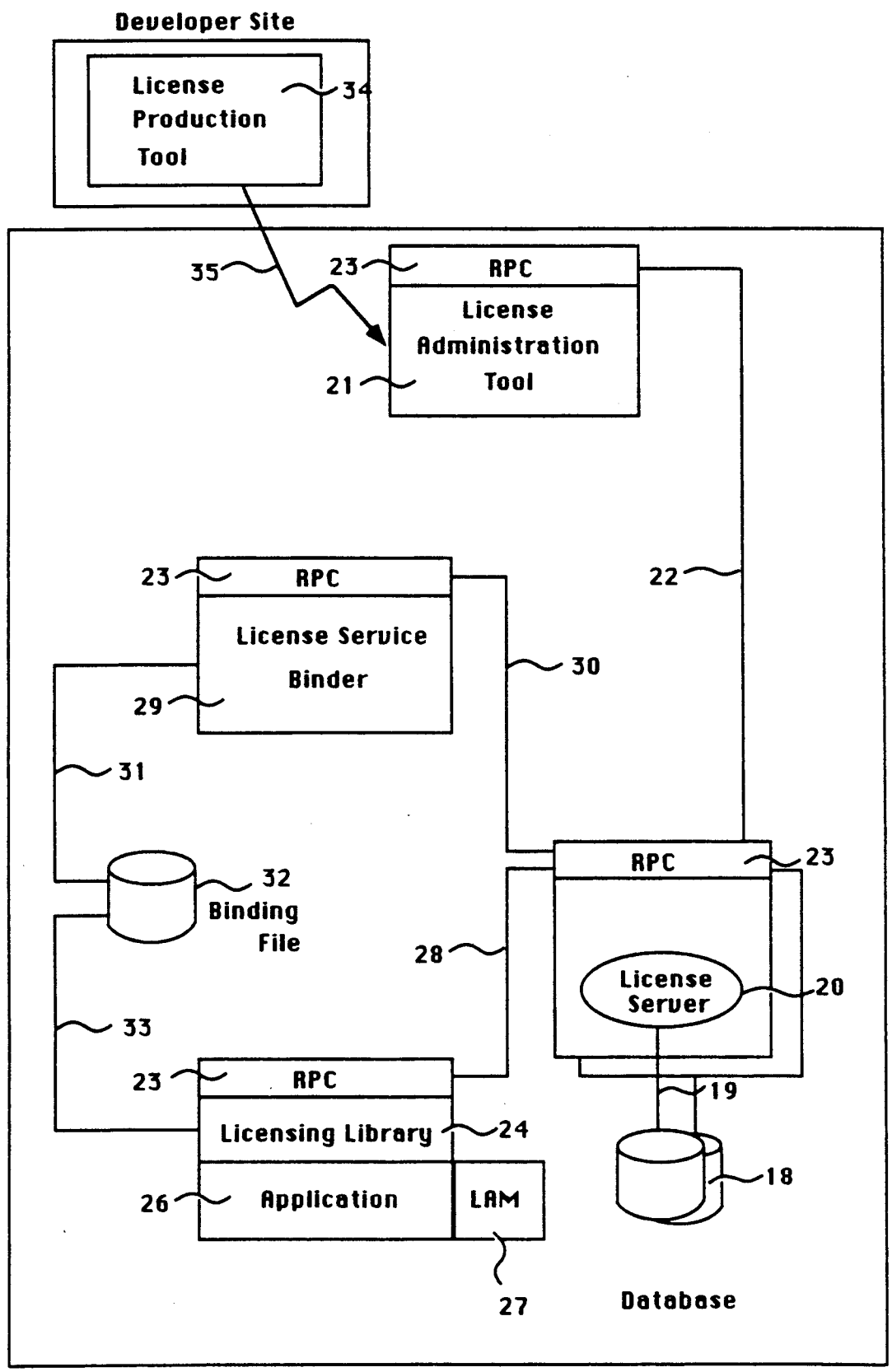
FIG. 2 illustrates the preferred embodiment of the apparatus of the present invention.

FIG. 2 illustrates the preferred embodiment of the apparatus of the present invention. The preferred embodiment of the apparatus of the present invention comprises at least one database 18, at least one database interface 19, at least one license server 20, a licensing library 24, a license access module 27, a license administration tool 22, a license service binder 29, a binding file 32, and a license production tool 34.

Each database 18 stores licensing information and application usage data. Preferably the database 18 comprises a plurality of records which contain the following information:

| Database Element | Description |
| --- | --- |
| Unique Key Table | Keys for all other tables |
| Vendor Table | Vendor's ID and name |
| Product Table | Product number and name |
| Version Table | Version number and date |
| License Table | License #, exp date, total units |
| License Token Table | Stores encoded license token |
| Unit Group Table | A group's allocation of license |
| Group List Table | Name of the group |
| Allowed Users Table | Credentials of allowed users |
| Current License Use Table | Applications using a license |
| Lock Table | Locked records in database |
| Authorized administrator Table | Login names of administrators |
| License Operation Log Table | Administrator's log information |
| License Usage Log Table | Request handle plus Client Log |
| License Queue Log Table | License wait queue |
| Application Message Log Table | Application specific messages |

Except for the license token table, the contents of the database 18 are accessible by the license administration tool 21 and an application 26. The license token table comprises encrypted license tokens. Each encrypted license token comprises a number of licenses of a software application purchased for the network of computers. The license token will be discussed in further detail below.

Each database interface 19 provides communication between the license server 20 and the database 18 in order to prevent concurrent access to the same database record by multiple users which can cause the data in the record to become corrupted. Thus, only the owner of the lock can read from and write to the locked record during the usage of the application.

Each license server 20 operates on an agent and interfaces the database 18 to license administration tool 21, licensing library 24 and license service binder 29. The license server 20 communicates with the license administration tool 21, licensing library 24 and license service binder 29 via an interface 23. These communications are performed without encryption. Preferably the interface 23 is a remote procedure call mechanism which permits a process operating on one device or agent connected to the network to request a resource or service from a remote device or agent connected to the network. See A. Birrell and B. Nelson, "Implementing Remote Procedure Calls," *ACM Transaction on Computer Systems*, Feb. 1984, Vol.2, No. 1. Additionally, if a license server 20 shares an agent with an user, it is preferred that the license server 20 operates in a background mode of the agent such that its operation is transparent to the user of that agent.

As will be described below, the license server 20 provides the following functions: 1) servicing the requests from the licensing library 24 for license token; (2) maintaining a wait queue for requests to the database 18 when no licensing units are available; (3) generating a lock file for exclusive access to database 18; and (4) providing access to information in the database 18. These functions may be implemented in a variety of manners well known in the art.

The licensing library 24 is a set of library routines which enable the application 26 to request licensing service from the license server 20. Upon receiving the request for service from the licensing library 24, the license server 20 retrieves a license token from the database 18 and transmits it to the licensing library 24. The licensing library 24 is linked with the application 26 and communicates with the license server 20 over a path 28 with, preferably, a remote procedure call mechanism 23. These communications are also performed without encryption. Among the major library calls in the licensing library 24 is the applications's request for a license from the license server 20. Other important library calls include the request to renew and to release a license. The application is installed and linked to the licensing library using standard operating system utilities of the agent executing the licensing library and the application. The licensing library functions may be implemented in a variety of manners well known in the art. The use of the license token to accomplish the request for the various licensing service will be described in detail below.

The license access module (LAM) 27 is application specific. It is prepared by the software vendor and integrated with the application 26. The application 26 uses the application specific license access module (LAM) 27 to decrypt and re-encrypt the license token for the licensing library. The application integrated with the application specific license access module (LAM) 27 may be distributed by the software vendor for installation on one of the computers in the network using any well known distribution medium in the art. The license access module (LAM) 27 is described in further detail below.

The license administration tool 21 is utilized by the network administrator to perform administrative functions relevant to the concurrent usage of a software application. The license administration tool 21 may run on any agent connected to the computer network. The license administration tool 21 is primarily used to install the license token into the database 18 through the license server 20. The communications between the license administration tool 21 and the license server 20 are also performed without encryption. The functionality of the license administration tool 21 includes: (1) starting or terminating a license server, (2) accessing a database controlled by a license server; and (3) generating and printing reports on license usage. The functions performed by licensing administration tool may be implemented in a variety of manners well known in the art.

Continuing to refer to FIG. 2, a license service binder 29 is shown coupled to the license server 20 over a path 30. The license service binder 29 is invoked by means known in the art, such as a network service program. The license service binder 29 locates all agents that are designated as servers on the network and keeps track of which server is servicing which application. The license service binder 29 contacts each server on its table of available servers and requests a list of products it serves. Finally the license service binder 29 writes the contents of the table of available license servers and the list of products into a binding file 32 over a path 31. In FIG. 2, the binding file 32 is coupled to the licensing library 24 over a path 33. The application 26 queries the binding file 32 to see which license server can service its request for a license. The binding file 32 and the functions performed by the license service binder 29 may be implemented in a variety of manners well known in the art.

A license production tool 34 is used by the software vendor to create the encrypted license tokens for distribution to the network administrator. The encrypted license tokens may be distributed in any distribution medium well known in the art. Receiving the license tokens, the network administrator installs with with the license administration tool 21 into the databases 18 through the license servers 20.

Figure 3:
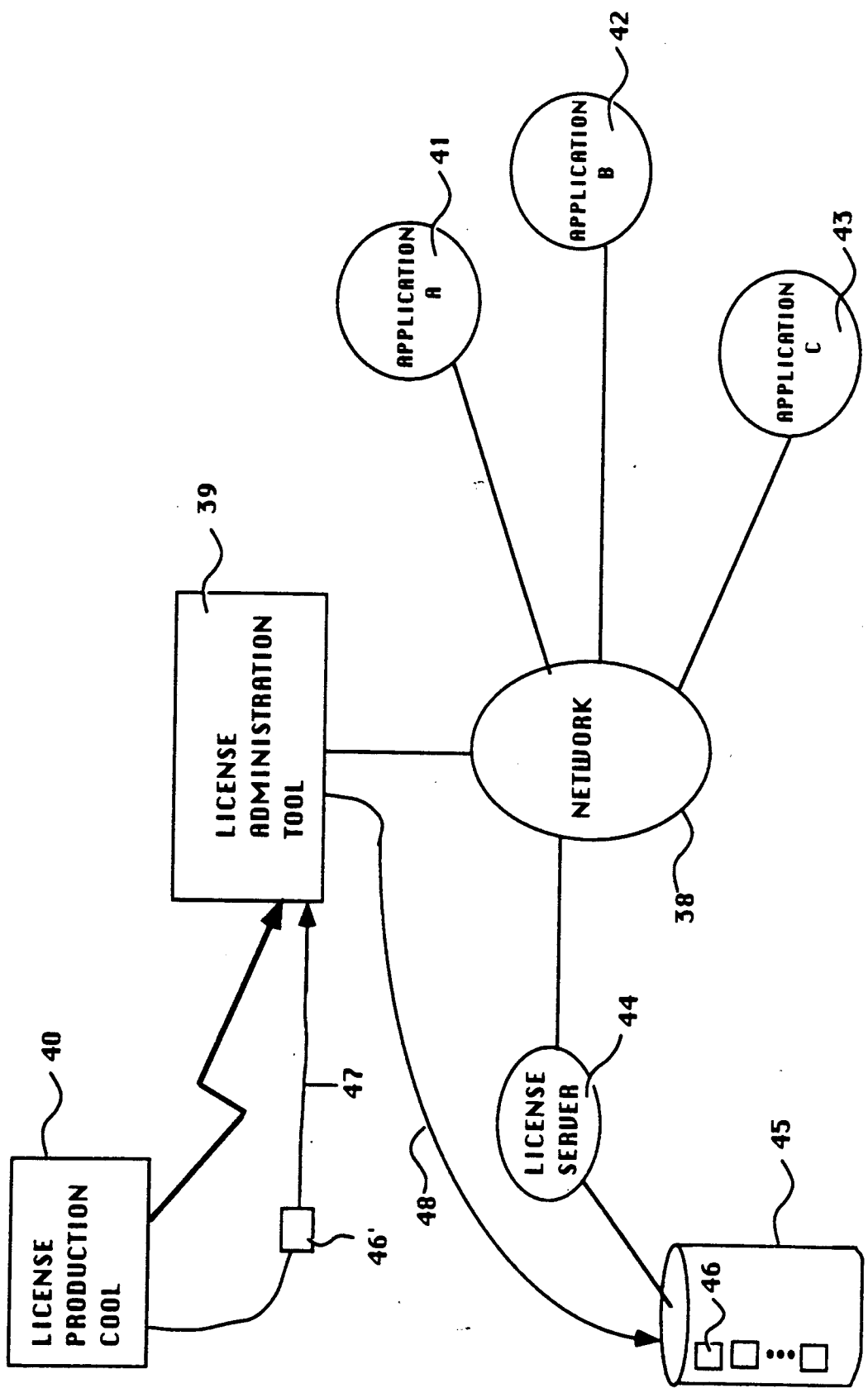
FIG. 3 describes the installation of a license token in the preferred embodiment of the present invention.

Referring to FIG. 3, the creation of a license token in a computer network employing the preferred embodiment of the present invention will be described. A computer network 38 is shown coupled with a license administration tool 39 and a single license server 44. The license server 44 communicates with a database 45. Applications 41, 42, and 43 are shown requesting licensing service from the license server 44. When a customer purchases a license for an application, such as a CAD/CAM program for its research and development department, the software vendor creates a license token with a license production tool, and delivers the license token to the customer's network administrator.

A license token is a special bit pattern or packet representing a license to use a software application. The network administrator installs the license token 46 into the database of the license server using the license administration tool 39. Unlike the token used in a token ring which is passed from agent to agent, a license token in the preferred embodiment of the present invention is passed only between a license server and a licensing library for a predetermined amount of time. The predetermined amount of time corresponds to the time the license token is checked out of the license server. Currently, the license token is checked out to an application for no more that ten seconds, and the license token is returned as quickly as possible to the issuing license server.

The license token 46 contains information encrypted in the vendor's format such as, vendor identification, product and version numbers as well as the number of license units purchased for the license token. A license unit corresponds to the license weighing for an agent connected to the computer network. For example, powerful workstations could require more license units to use a software application than an average personal computer.

The software vendor produces a license token using a license production tool 40. A path 47 illustrates how a license token 46' makes its way to a license administration tool 39 at the customer's site. there, the system administrator installs the license token 46' as license token 46 into the license database 45 of the license server 44. A path 48 indicates the transfer of the license token 46' from the license administration tool 39 to the license server 44 and into the database 45 as license token 46. The license server 44 is now ready to entertain requests from application 41, 42, and 43 for a license to use the application corresponding to token 46 as well as other applications represented in its database 45.

It should be understood that each network may have a plurality of license servers and each license server may have in its database a plurality of license tokens for a variety of software applications. Referring again to FIG. 3, if application A 41 requests and checks out the license token 46 for less than ten seconds, applications B and C 42, 43 would be unable to check out the license token 46 if their requests were made during the same time application 41 is checking out a license from the license token 46 because of the locking mechanism provided by database interface 19. Thus, to achieve concurrent license usage in network 38, it is preferred that the network administrator installs more than one license server. To minimize the task of recovering from license server crashes, it is also preferred that the system administrator spreads the license servers, the network administrator may want to allocate the twenty license units for any one application among a plurality of strategically located license servers. For instance, if a network has four license units for a particular popular application among four license tokens with five license units for each license token. In the event one license server crashes or the license token is checked out, the other three license servers may provide licensing service to other applications.

Figure 4A:
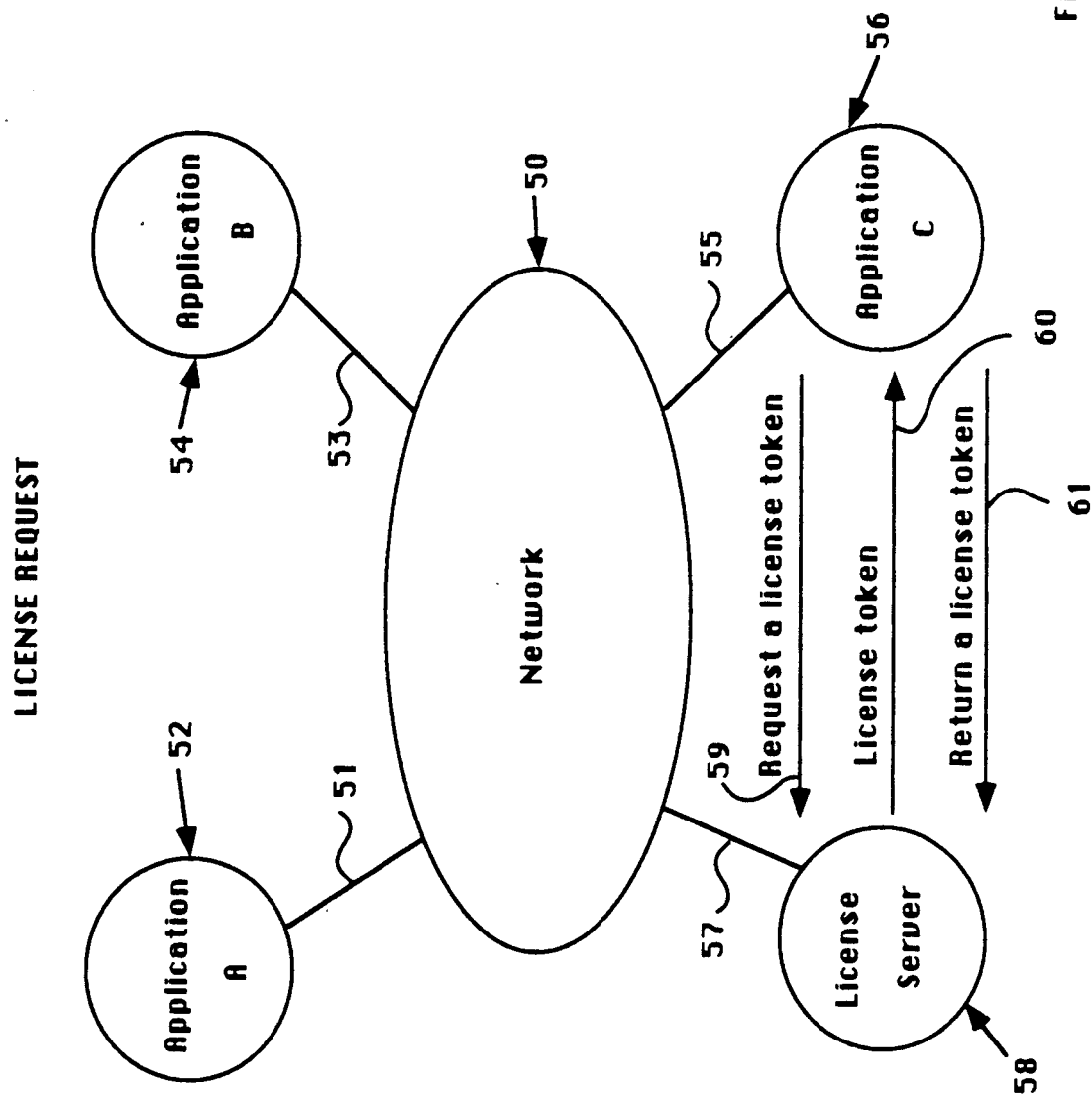
FIG. 4a illustrates the use of a license token to request a license from a license server in the preferred embodiment of the present invention.

FIG. 4a illustrates the use of a license token to request for a license. As shown, a network 50 is provided, and is coupled to Applications 52, 54 and 56 respectively. Application 56 succeeded in requesting a license token from the license server 58 through the licensing library (not shown) in step 59. The license token is transmitted to application 56 through the licensing library in step 60. The application 56 decrypts the encrypted license token using the application specific license access module (not shown). Upon decryption, the licensing library verifies the licensing information stored in the decrypted license token against the licensing information stored in the application 56. Upon verification, the licensing library assigns a license to the application 56, and updates the decrypted license token (licensing). Then, the application 56 re-encrypts the updated license token using the application specific license access module. When done, Application 56 returns the license token to the license server 58 through the licensing library in step 61. The license information in the decrypted license token that are compared against the license information maintained in the application comprises: (1) flag (2) maintenance contract date, (3) host name and domain, (4) product name, (5) host id number, (6) license serial number, and (7) expiration date of license. Updating of the license token comprises decrementing the license units in the license token by the number of license units being checked out by the application. 56.

Aside from the license request function performed with the license token as shown in FIG. 4a, the license token is also used in other critical stages of the licensing process. For example, an user may wish to run an application beyond the initial allocated time. As shown in FIG. 4b, Application 68 makes a license renewal request 71 from the license server 70 with license token 72 through the licensing library (not shown). Similarly, the encrypted license token is provided to the application 68 through the licensing library. The application 68 decrypts the license token using the application specific license access module (not shown). Upon decryption, the licensing library then verifies the licensing information in the decrypted license token against the licensing information maintained in the application 68. Upon verification, the licensing library renews the license assigned to the application 68, and updates the decrypted token (licensing renewal). Then, the application 68 re-encrypts the updated license token using the application specific license access, module, and returns the re-encrypted license token to the license server 70 through the licensing library. Updating of the license token comprises decrementing the license units in the license token by the number of license units being checked out by the application 68.

Figure 4C:
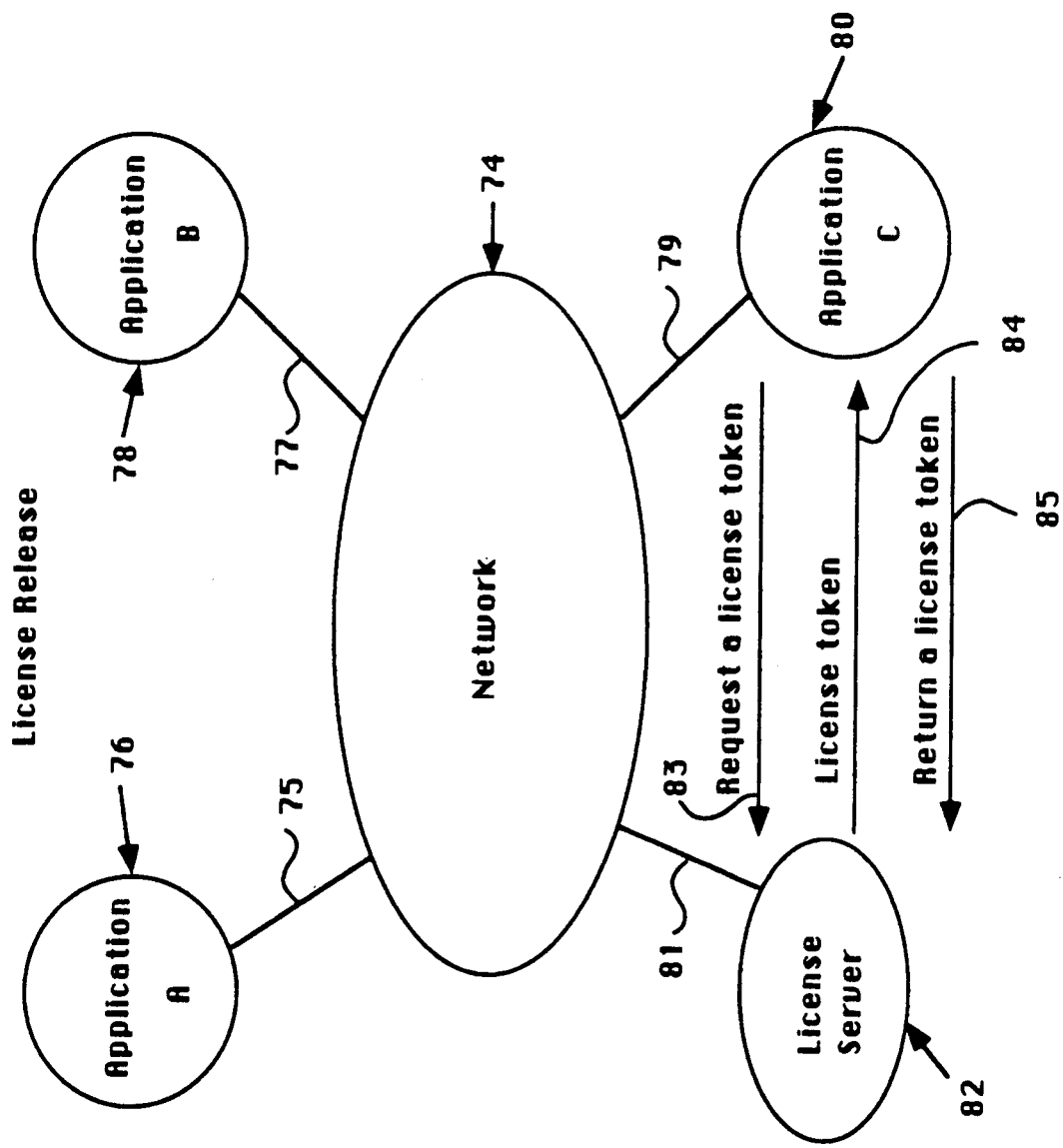
FIG. 4c illustrates the use of a license token to release a license from a license server in the preferred embodiment of the present invention.

Similarly, in FIG. 4c the user makes a license release request 83 through the licensing library (not shown) when the application no longer needs the license units. Again, the encrypted license token is provided to the application 80 through the licensing library. The application 80 decrypts the license token using the application specific license access module (not shown). Upon decryption, the licensing library verifies the licensing information in the decrypted license token against the licensing information maintained in the application 80. Upon verification, the licensing library releases the license assigned to the application 80, and updates the decrypted token (unlicensing). Then, the application 80 re-encrypts the updated license token using the application specific license access module, and returns the re-encrypted license token to the license server 82 through the licensing library. Updating of the license token comprises incrementing the license units in the license token by the number of license units released by the application 80.

Referring back to FIG. 2, as described earlier, a license access module (LAM) 27 is linked with the application 26 and the licensing library 24 to form the executable code that software vendors ship to the customers. The license access module 27 decodes and encodes the application's encrypted license token as it is being passed between the server 20 and the licensing library 24. Thus the level of security of an application from unauthorized use depends heavily upon how secure the license access module is. On the other hand, the inpact of breaching an application's encryption/decryption scheme is limited to one application.

In contrast, conventional network licensing schemes use public/private key encryption to encode sensitive information being passed between the license servers 20 and the licensing library 24, and between the license server 20 and the license administration tool 21. Such a scheme is effective if the license servers 20 is in a trusted environment. However, the customer has the same access to any agent in a network, including the license servers 20. The security of the licensing scheme can be compromised by a user who decrypts one of the license server's private key. Once the unauthorized user determines one of the server's private key, he can decrypt all sensitive information on the particular license server 20. Should all license servers 20 use the same key, as is frequently done, then all the security of the applications served by all the license servers 20 will be compromised. Thus, it will be appreciated that the present invention provides improved network-wide protection against unauthorized use of software applications over the prior art.

The application specific license access module 27 first translates a license token from a vendor specific format to a format usable by the licensing library 24. The application specific license access module accomplishes the translation in two modules. One module translates or decodes a license token from a vendor specific format to a licensing library format. The second module translates or encodes the updated license token from the licensing library format to the vendor specific format. The second module is invoked anytime the licensing library updates the information in a license token.

The decoding and encoding modules allow software vendors to implement their own security mechanism to protect their licenses from unauthorized use even through they reside at the customer's site.

```
#define LIC_RENEWAL_TIME (60)        /*set renewal time for this session*/
#define EST_LIC_RENEWAL_TIME (LIC_RENEWAL_TIME x .9)
NL_vendor_id NL_Vendor_id = 1223;
NL_prod_num NL_Prod_num = "02"                    /*set vendor #*/
NL_version NL_Version = (12/20/88, "1.0");        /*set product #*/
...                                               /*set version id #*/ status = NL_init (vendor_id, NULL, &job_id);  /*initialize license service*/
if (status != NL_NO_ERROR) /*accept job id if no error*/
    {
    fprintf (stderr, "nl_init failed - error =
    %d/n", status);                         /*error message if error and
                                              return*/
    return;
    }
units = 3;
code_funcs.encode_p = nl_encode;          /*pointer to encode function*/
code_funcs.decode_p = nl_decode;          /*pointer to decode function*/
if (signal (SIGALRM), alarm_intr) == (void*)-1)   /*set alarm if no
```

```
                                                                 error/
                {
                perror ("Cannot set SIGALRMN);/otherwise, error message/
                return;
                }
            status = NL_request (job_id,           /request a license/
            NL_Prod_num, &NL_Version,
            units, LIC_RENEWAL_TIME, NL_L2_SRCH,
            &code_funcs, NULL,
            &req_handle, NULL, &app_info);
            if (status != NL_NO_ERROR)             /no error, license
checked
                {                                  out from license
server/
                fprintf (stderr, "nl_request failed - error=
                %d/n", status);                    /otherwise, error
message/
                return;
                }
    /   *
        *We got a license                          /license request
successful/
        */
        alarm (EST_LIC_RENEWAL_TIME);   /set alarm for license renewal
                                                    time/
    ...     Application Runs                       /runs application/

...     status = NL_release (req_handle);     /request to release a license/
            if (status != NL_NO_ERROR)
                {
                fprintf (stderr, "nl_release failed - error=   /otherwise, error
                %d/n", status);                    messages/
                return;
                }
    ...
            int
            alarm_intr ()
                {
            status = NL_confirm (reg_handle,       /renew licensing unit with
            LIC_RENEWAL_TIME, NULL);               licensing server/
    /   *
        *Verify vendor private information
        */
                }
            If (status != NL_NO_ERROR) '
            fprintf (stderr, "nl_confirm failed - error =     /otherwise, error
            %/n", status);                         message/
                {
                        puts ("license renewed")   /successful license
                }                                  renewal/
```

The sample application given above is accompanied by self-explanatory annotation to the right margin of the codes. Of particular interest are variables code_funcs.encode.p and code_funcs.decode_p. These variables are pointers to the software vendor's encode and decode routines, repectively. Taking the pointers in the variables, the licensing library can use the pointers to invoke the decoding and encoding routines in the license access module. The three major licensing library routines, request for a license (NL_request), release a license (NL₁₃ release) and renew a license (NL_confirm) invoke the decoding and encoding routines. As discussed earlier, these licensing library routines may be implemented in a variety of manners well known in the art. For example of a license access module, see Appendix 1.

In implementing the license access module, the license server becomes merely a bridge to the repository for license tokens. The licensing library coupled to the application performs the procedure of authenticating the license token prior to granting a license and therefore access to run the application. Because the level of security of the system is dictated by the license access module, the software vendors are free to make the license access module as simple or as complex as they desire. In particular, they are free to adopt any of the encryption schemes as part of their encryption routines. If the security mechanism is broken, and the encryption known to others, then the software vendors can easily remedy the situation by releasing a new version of the product with a new license access module.

While the present invention has been particularly described with reference to FIGS. 1-4 as well as Appendix 1, and with emphasis on certain language in implementing a method to protect against the unauthorized use of software application in a computer network environment, it should be understood that they are for illustration only and should not be taken as limitation upon the invention. In addition, it is clear that the apparatus and method of the present invention has utility in any application run in a computer network environment. It is contemplated that many changes and modifications may by made, by one skilled in the art, without departing from the spirit and scope of the invention disclosed above.

```
/*
 * @(#)nl_lam.c 1.21 89/09/13
 * Copyright (c) 1988 by Sun Microsystems, Inc.
 */
/*
 ************************************************************************
 *
 * Module: nl_lam.c
 *
 * Description:
 *      Contains the license access modules. Uses XDR to keep the license
 *      token in a machine independent form. Uses the des_crypt(3) routines
 *      to encrypt/decrypt the licensing information.
 *
 * Functions:
 *      nl_decode()     - Decodes a vendor's license token
 *      nl_encode()     - Encodes a vendor's license token
 *
 * Notes:
 *
 ************************************************************************
 */
#include        <rpc/rpc.h>
#include        <string.h>
#include        <memory.h>
#include        "nl_types.h"
#include        "nl_prot_limits.h"
#include        "nl_request.h"
#include        "nl_token.h"
#include        "nl_vendor.h"
#include        "nl_licensel.h"
#include        "nl_errno.h"
/*
 ************************************************************************
 * Module Local Definitions
 ************************************************************************
 */
/*
 * Warning: This could be a potential security threat, leaving a unencoded
 * token lying around in memory.
 */
static  NL_license _nl_lic_tok;

/*
 ************************************************************************
 * Function Declarations
 ************************************************************************
 */
void            nl_lam();
static  int     _nl_decode();
static  int     _nl_encode();
/*
 ************************************************************************
 *
 * Function: nl_lam
 *
 * Description:
 *      This function returns the address of the encode and decode routines.
 *
 * Input:
 *      conv_2_ascii_p  - storage that indicates whether to conv to ascii
 *      code_func_p     - storage contains address of encode/decode routines
 *
 * Output:
 *      conv_2_ascii_p  - returns an indication whether the token should
 *                        be converted to ascii so that it may be printable.
 *      code_func_p     - Contains address of encode/decode routines
 *
 * Returns:
 *      Nothing
```

```
*  Notes:
*       1)  The reason that the conv_2_ascii_p value is returned is to
*           inform the License Production Tool if it needs to do an
*           ascii encoding on the license token. The license token must
*           be in some type of ascii form to allow it to be transmitted over
*           voice phone or to be Fax'ed to an end user.
*
****************************************************************
*/
void
nl_lam(conv_2_ascii_p, code_func_p)
bool_t          *conv_2_ascii_p;
NL_code_funcs   *code_func_p;
{
        if (conv_2_ascii_p != NULL)
        {
                *conv_2_ascii_p= TRUE;
        }
        code_func_p->decode_p = _nl_decode;
        code_func_p->encode_p = _nl_encode;
} /* nl_lam */

/*
****************************************************************
*
* Function: nl_decode
*
* Description:
*       Translates a license token from vendor specific format to a
*       client library specific format.
*
* Input:
*       en_tok_p        - Pointer to the encoded token
*       en_length       - Length of the encoded token in bytes
*
* Output:
*       tok_p           - Pointer to the token structure to fill in
*       clnt_entry_p    - Pointer to the address of the first client usage
*                         entry
*
* Returns:
*       NL_NO_ERROR     - Decoding succeeded
*       NL_E_DECODE_FAIL
*
* Side Effects:
*       1) Allocates memory for the the client usage entries.
*
* Notes:
*       1) If tok_p->vend_priv_p or tok_p->vend_priv_p->data_p is NULL
*          then the call doesn't want it.
*
****************************************************************
*/
static int
_nl_decode(en_tok_p, en_length, tok_p, clnt_entry_p)
char            *en_tok_p;
int             en_length;
NL_token        *tok_p;
NL_clnt_entry   **clnt_entry_p;
{
        NL_usage_entry  usage_entry;
        NL_clnt_entry   *tmp_clnt_entry_p;
        XDR             xdrs;
        int             i;
        int             status;
        int             vend_size;

/*
         * Make sure the size for the encoded token is divisible by
         * xdr bytes per unit.
         */
```

```
if (en_length != RNDUP(en_length))
{
        return (NL_E_DECODE_FAIL);
}

/*
 * Init an XDR stream
 */
xdrmem_create(&xdrs, en_tok_p, (u_int)en_length, XDR_DECODE);
status = NL_NO_ERROR;
if (xdr_NL_license(&xdrs, &_nl_lic_tok) == FALSE)
{
        xdr_destroy(&xdrs);
        return (NL_E_DECODE_FAIL);
} if (_nl_lic_tok.magic == MY_VENDOR_MAGIC)
{
        tok_p->vendor_id = _nl_lic_tok.vendor_id;
        (void) strncpy(tok_p->prod_num, _nl_lic_tok.prod_num,
                NL_PROD_NUM_SIZE);
        tok_p->vers_secs = _nl_lic_tok.vers_secs;
        memcpy(tok_p->serial_num, _nl_lic_tok.serial_num,
                NL_SERIAL_NUM_SIZE);
        tok_p->expire_secs = _nl_lic_tok.expire_secs;
        tok_p->maint_secs = _nl_lic_tok.maint_secs;
        tok_p->total_units = _nl_lic_tok.total_units;
        tok_p->avail_units = _nl_lic_tok.avail_units;
        (void) strncpy(tok_p->host, _nl_lic_tok.host, NL_HOST_NAME_SIZE);
        (void) strncpy(tok_p->domain, _nl_lic_tok.domain,
                NL_DOMAIN_NAME_SIZE);
        tok_p->hostid = _nl_lic_tok.hostid;
        tok_p->flag = _nl_lic_tok.flag;
        tok_p->num_clnts = _nl_lic_tok.num_clnts;

/*
         * Give the use a copy of the vendor private data if they
         * want it.
         */
        vend_size = MIN(_nl_lic_tok.vend_priv_size,
                NL_VEND_PRIV_SIZE);
        if (vend_size > 0 && tok_p->vend_priv_p != NULL &&
                tok_p->vend_priv_p->data_p != NULL)
        {
                tok_p->vend_priv_p->length = vend_size;
                (void) memcpy(tok_p->vend_priv_p->data_p,
                        _nl_lic_tok.vend_priv,
                        MIN(vend_size, tok_p->vend_priv_p->length));
        } tmp_clnt_entry_p = (NL_clnt_entry *)
                malloc((tok_p->num_clnts+1)* sizeof(NL_clnt_entry));
        *clnt_entry_p = tmp_clnt_entry_p;
        for (i=0; i < tok_p->num_clnts; i++, tmp_clnt_entry_p++)
        {
                xdr_NL_usage_entry(&xdrs, &usage_entry);
                tmp_clnt_entry_p->req_handle = usage_entry.req_handle;
                tmp_clnt_entry_p->units = usage_entry.units;
                tmp_clnt_entry_p->renew_secs = usage_entry.renew_secs;
                tmp_clnt_entry_p->clnt_secs = usage_entry.clnt_secs;
                tmp_clnt_entry_p->pid = usage_entry.pid;
        }
}
else
{
        status = NL_E_DECODE_FAIL;
} xdr_destroy(&xdrs);
```

```
        return (status);
} /* nl_decode */

/*
************************************************************
*
* Function: nl_encode
*
* Description:
*       Translates a license token from a client library specific format
*       to a vendor specific format. Verifies that the encrypted token
*       does not exceed the NL_MAX_EN_TOKEN_SIZE.
*
* Input:
*       tok_p           - Pointer to the token structure to read data from
*       clnt_entry_p    - Pointer to the address of the first client usage
*                         entry
*
* Output:
*       en_tok_p        - Pointer to the encoded token
*       en_length       - Length of the encoded token in bytes
*
* Returns:
*       NL_NO_ERROR     - Encoding succeeded
*       NL_E_ENCODE_FAIL
*
* Side Effects:
*       1) Frees memory for the the client usage entries.
*
* Notes:
*       1) If tok_p->vend_priv_p is NULL then the call doesn't want it.
*
************************************************************
*/
static int
nl_encode(tok_p, clnt_entry_p, en_tok_p, en_length_p)
NL_token            *tok_p;
NL_clnt_entry       *clnt_entry_p;
char                *en_tok_p;
int                 *en_length_p;
{
        XDR                 xdrs;
        NL_usage_entry      usage_entry;
        NL_clnt_entry       *tmp_clnt_entry_p;
        int                 i;
        int                 tok_len1;
        int                 tok_len2;
        int                 status;

status = NL_NO_ERROR;

/*
         * Init an XDR stream
         */
        xdrmem_create(&xdrs, en_tok_p, (u_int)NL_MAX_EN_TOKEN_SIZE, XDR_ENCODE);

/*
         * If for some reason the license token that we will encode is
         * not the same as the previous one decoded (in our module
         * local global) then we copy the information in.
         */
        if (memcmp(_nl_lic_tok.serial_num, tok_p->serial_num,
                NL_SERIAL_NUM_SIZE) != 0)
        {
                _nl_lic_tok.magic = MY_VENDOR_MAGIC;
                _nl_lic_tok.vendor_id = tok_p->vendor_id;
                (void) strncpy(_nl_lic_tok.prod_num, tok_p->prod_num,
                        NL_PROD_NUM_SIZE);
                _nl_lic_tok.vers_secs = tok_p->vers_secs;
                (void) memcpy(_nl_lic_tok.serial_num, tok_p->serial_num,
                        NL_SERIAL_NUM_SIZE);
```

```c
        _nl_lic_tok.expire_secs = tok_p->expire_secs;
        _nl_lic_tok.maint_secs = tok_p->maint_secs;
        (void) strncpy(_nl_lic_tok.host, tok_p->host, NL_HOST_NAME_SIZE);
        (void) strncpy(_nl_lic_tok.domain, tok_p->domain,
                NL_DOMAIN_NAME_SIZE);
        _nl_lic_tok.hostid = tok_p->hostid;
        _nl_lic_tok.flag = tok_p->flag;
        if (tok_p->vend_priv_p != NULL &&
                tok_p->vend_priv_p->data_p != NULL)
        {
                _nl_lic_tok.vend_priv_size =
                        MIN(tok_p->vend_priv_p->length,
                        NL_VEND_PRIV_SIZE);
                (void) memcpy(_nl_lic_tok.vend_priv,
                        tok_p->vend_priv_p->data_p,
                        _nl_lic_tok.vend_priv_size);
        }
        else
        {
                _nl_lic_tok.vend_priv_size = 0;
                _nl_lic_tok.vend_priv[0] = NUL;
        }
}
_nl_lic_tok.total_units = tok_p->total_units;
_nl_lic_tok.avail_units = tok_p->avail_units;
_nl_lic_tok.num_clnts = tok_p->num_clnts;

if (xdr_NL_license(&xdrs, &_nl_lic_tok) == FALSE)
{
        xdr_destroy(&xdrs);
        return (NL_E_ENCODE_FAIL);
} if (clnt_entry_p != NULL)
{
        tmp_clnt_entry_p = (NL_clnt_entry *)
                malloc((_nl_lic_tok.num_clnts+1)
                sizeof(NL_clnt_entry));
        tmp_clnt_entry_p = clnt_entry_p;
        tok_len1 = (int)xdr_getpos(&xdrs);
        for (i=0; i < tok_p->num_clnts; i++, tmp_clnt_entry_p++)
        {
                usage_entry.req_handle = tmp_clnt_entry_p->req_handle;
                usage_entry.units = tmp_clnt_entry_p->units;
                usage_entry.renew_secs = tmp_clnt_entry_p->renew_secs;
                usage_entry.clnt_secs = tmp_clnt_entry_p->clnt_secs;
                usage_entry.pid = tmp_clnt_entry_p->pid;
                xdr_NL_usage_entry(&xdrs, &usage_entry);

/*
                 * Quick check here for the first pass of
                 * this loop. We find out how many bytes it
                 * took to encode 1 users entry. We then
                 * estimate the total number of bytes
                 * required and make sure that we will
                 * not exceed NL_MAX_EN_TOKEN_SIZE.
                 */
                if (i == 0)
                {
                        tok_len2 = (int)xdr_getpos(&xdrs) -
                                tok_len1;
                        tok_len2 *= tok_p->num_clnts;
                        if ((tok_len1+tok_len2) >
                                NL_MAX_EN_TOKEN_SIZE)
                        {
                                i = tok_p->num_clnts;
                                status = NL_E_ENCODE_FAIL;
                        }
                }
        }
        free ((char *)clnt_entry_p);
```

```
    }
    *en_length_p = (int)xdr_getpos(&xdrs);

xdr_destroy(&xdrs);

return (status);
} /* nl_encode */
```

I claim:

1. In a network of computers comprising at least one computer executing at least one application programs, a method for licensing an application program that further increases network-wide protection against unauthorized execution of said application program, said method comprising the steps of:

storing a first license token in a first database by a first license server, said first license token comprising licensing information of said application program and being stored in encrypted format;

retrieving said stored first license token for said application program by said first license server, said retrieval being requested of said first license server by a licensing routine of a licensing library for licensing said application program for execution;

verifying said licensing information stored in said retrieved first license token against licensing information maintained by said application program in conjunction with said licensing routine after said retrieved first license token has been decrypted by an application program specific license access module integrated with said application program;

licensing said application program for execution upon said verification by said licensing routine;

updating said retrieved first license token upon said licensing by said licensing routine; and returning said updated first license token to said first license server for storage in said first database by said licensing routine after said updated first license token has been re-encrypted by said application program specific license module integrated with said application program.

2. The method as defined in claim 1, wherein said first license token comprises licensing information for at least one version of said application program.

3. The method as defined in claim 1, wherein said re-encrypted first license token is returned by said licensing routine to said first license server for storage in said first database within a predeterminded time period.

4. The method as defined in claim 1, wherein said method further comprises the step of receiving said first license token from said application program's vendor and providing said first license token to said first license server for storage in said first database, said first license token being received from a distribution medium of said application program and provided to said first license server in encrypted format by a license administration tool.

5. The method as defined in claim 4, wherein said method further comprises the step of producing said first license token on said distribution medium in said encrypted format by said application program's vendor by a license production tool.

6. The method as defined in claim 1, wherein said method further comprises the step of receiving said application program integrated with said application program specific license access module from a distribution medium of said application program and installed onto said computer:

said application program specific license access module being integrated with said application program and placed on said distribution medium by said application program's vendor.

7. The method as defined in claim 1, wherein said application program specific license access module comprises a decrypting module for decrypting said first license token and an encrypting module for encrypting said first license token, said decrypting and encrypting module being executed by said computer.

8. The method as defined in claim 1, wherein said step of updating said retrieved first license token upon said licensing comprises decrementing license units in said retrieved first license token.

9. The method as defined in claim 1, wherein method further comprises the steps of:

retrieving said stored first license token for said application program by said first license server, said retrieval being requested of said first license server by an unlicensing routine of a licensing library for unlicensing said application program for execution;

verifying said licensing information stored in said retrieved first license token against licensing information maintained by said application program by said unlicensing routine after said retrieved first license token has been decrypted by said application program by an application program specific license access module integrated with said application program;

unlicensing said application program for execution upon said verification by said unlicensing routine;

updating said retrieved first license token upon said unlicensing by said unlicensing routine; and returning said updated first license token to said first license server for storage in said first database by said unlicensing routine after said updated first license token has been re-encrypted by said application program specific license access module integrated with said application program.

10. The method as defined in claim 9, wherein step of updating said retrieved first license token upon said unlicensing comprises incrementing license units in said retrieved first license token.

11. The method as claimed in claim 1, wherein said method further comprises the steps of:
storing a second license token in a second database by a second license server, said second license token comprising licensing information of said application program and being stored in encrypted format;
storing a first and second license server identifiers identifying said first and second license servers in a binding file, said licensing library accessing said binding file to select said first license server to retrieve said first license token; and
identifying said first and second license servers and storing said first and second license server identifiers into said binding file by a license service binder.

12. The method as defined in claim 11, wherein said second license token comprises licensing information for at least one version of said application program.

13. The method as defined in claim 11, wherein said method further comprises the step of receiving said first and second license tokens from a distribution medium of said application program and providing said first and second license tokens to said first and second license servers for storage in said first and second databases respectively by a license administration tool, said first and second license tokens being received by said license administration tool and provided to said first and second license servers in encrypted format.

14. The method as defined in claim 13, wherein said method further comprises the step of producing said first and second license tokens on said distribution medium in said encrypted format by said application program's vendor by a license production tool.

15. In a network of computers comprising at least one computer executing at least one application program, an apparatus for licensing an application program that increases network-wide protection against unauthorized execution of said application program, said apparatus comprising:
first database means comprising a first database for storing a first license token, said first license token comprising licensing information of said application program and being stored in encrypted format;
first license server means coupled to said first computer and said first database means comprising a first license server for storing said first license token into said first database and for retrieving said stored first license token from said first database;
a licensing library comprising a licensing routine for requesting said first license server to retrieve said first license token for said application program, verifying said licensing information stored in said retrieved first license token against licensing information maintained by said application program after said retrieved first license token has been decrypted by said application program, licensing said application program for execution upon said verification, updating said retrieved first license token upon said licensing, and returning said updated first license token to said first license server for storage in said first database after said updated first license token has been re-encrypted by said application program, said licensing library including said licensing routine being executed by said computer; and
a license access module specific for said application program and integrated with said application program for decrypting said retrieved first license token and re-encrypting said updated first license token, said license access module being executed by said computer.

16. The apparatus as defined in claim 15, wherein said first license token comprises licensing information for at least one version of said application program.

17. The apparatus as defined in claim 15, wherein said re-encrypted first license token is returned by said licensing routine to said first license server for storage in said first database within a predetermined time period.

18. The apparatus as defined in claim 15, wherein said apparatus further comprises license administration tool means coupled to said first license server means comprising a license administration tool for initially receiving said first license token from a distribution medium of said application program and providing said first license token to said first license server for storage in said first database, said first license token being received by said license administration tool and provided to said first license server in encrypted format.

19. The apparatus as defined in claim 18, wherein said apparatus further comprises license production tool means comprising a license production tool for producing said first license token on said distribution medium in said encrypted format by said application program's vendor.

20. The apparatus as defined in claim 15, wherein said application program integrated with said application program specific license access module is received from a distribution medium of said application program, and installed onto said computer, said application program specific license access module being integrated with said application program and placed on said distribution medium by said application program's vendor.

21. The apparatus as defined in claim 15, wherein said application program specific license access module comprises a decrypting module for decrypting said first license token and an encrypting module for encrypting said first license token, said decrypting and encrypting modules being executed by said computer.

22. The apparatus as defined in claim 15, wherein said licensing routine performs said update of said retrieved first license token upon said licensing by decrementing license units in said retrieved first license token.

23. The apparatus as defined in claim 15, wherein said licensing library further comprises an unlicensing routine for requesting said first license server to retrieve said first license token for said application program, verifying said licensing information stored in said retrieved first license token against licensing information maintained by said application program after said retrieved first license token has been decrypted by said application program, unlicensing said application program for execution upon said verification, updating said retrieved first license token upon said unlicensing, returning said updated first license token to said first license server for storage in said first database after said updated first license token has been re-encrypted by said application program.

24. The apparatus as defined in claim 23, wherein, said unlicensing routine performs said update of said retrieved first license token upon said unlicensing by incrementing license units in said retrieved first license token.

25. The apparatus as defined in claim 15, wherein said apparatus further comprises:
   second database means comprising a second database for storing a second license token, said second license token comprising licensing information of said application program and being stored in encrypted format;
   second license server means coupled to said computer and second database means comprising a second license server for storing said second license token into said second database and for retrieving said stored second license token from said second database;
   binding file means coupled to said computer comprising a binding file for storing a first and second license server identifiers identifying said first and second license servers, said licensing library accessing said binding file to select said first license server to retrieve said first license token; and
   license binding means coupled to said first and second license server means and said binding file means comprising a license service binder for identifying said first and second license servers and storing said first and second license server identifiers into said binding file.

26. The apparatus as defined in claim 25, wherein said second license token comprises licensing information for at least one version of said application program.

27. The apparatus as defined in claim 25, wherein said apparatus further comprise license administration tool means coupled t said first license and second license server means comprising a license administration tool for initially receiving said first and second license tokens from a distribution medium of said application program and providing said first and second license tokens to said first and second license servers for storage in said first and second databases respectively, said first and second license tokens being received by said license administration tool and provided to said first and second license servers in encrypted format.

28. The apparatus as defined in claim 27, wherein said apparatus further comprises a license production tool means comprising a license production tool for producing said first and second license tokens on said distribution medium in said encrypted format by said application program's vendor.

* * * * *

UNITED STATES PATENT AND TRADEMARK OFFICE
CERTIFICATE OF CORRECTION

PATENT NO. : 5,138,712

DATED : August 11, 1992

INVENTOR(S) : John R. Corbin

It is certified that error appears in the above-identified patent and that said Letters Patent is hereby corrected as shown below:

In the title page, section [54], please delete " ON " and insert -- IN --.

In the title page, section [57], line 12 of the Abstract, please delete " In " and insert -- An --.

In column 1 at line 41, please delete " softward " and insert -- software --.

In column 1 at line 49, and column 2 at line 8, please delete " of " and insert -- to --.

In column 1 at line 59 and 68, please delete " or " and insert -- of --.

In column 5 at line 3, please delete " asume " and insert -- assume --.

In column 5 at line 38, please delete " 22 " and insert -- 21 -- .

In column 7 at line 41, please delete " with " and insert -- them --.

In column 8 at line 16, please delete " there " and insert -- There --.

In column 9 at line 31, please delete " , " (1st. occurrence).

UNITED STATES PATENT AND TRADEMARK OFFICE
CERTIFICATE OF CORRECTION

PATENT NO. : 5,138,712
DATED : August 11, 1992  PAGE 2 OF 2
INVENTOR(S) : John R. Corbin It is certified that error appears in the above-identified patent and that said Letters Patent is hereby corrected as shown below:

In column 10 at line 52, please insert -- Below is an example of a sample application using the licensing library and the license access module written in C language: --

In the table below column 9 and 10 at line 11, please delete " %d / n " and insert -- %d \ n --.

In the table on column 11 and 12 at line 29, please delete " 1 " and insert -- I --.

In the table on column 11 and 12 at line 32 and 47, please delete " %d / n " and insert -- %d \ n --.

Signed and Sealed this

Twenty-fifth Day of March, 1997

*Attest:*

BRUCE LEHMAN

*Attesting Officer*   Commissioner of Patents and Trademarks